US008219165B2

(12) United States Patent
Kikuchi et al.

(10) Patent No.: US 8,219,165 B2
(45) Date of Patent: Jul. 10, 2012

(54) RADIO COMMUNICATION APPARATUS

(75) Inventors: Hironori Kikuchi, Miyagi (JP); Kenichi Sato, Miyagi (JP)

(73) Assignee: Panasonic Corporation, Osaka (JP)

( * ) Notice: Subject to any disclaimer, the term of this patent is extended or adjusted under 35 U.S.C. 154(b) by 190 days.

(21) Appl. No.: 12/810,702

(22) PCT Filed: Sep. 30, 2008

(86) PCT No.: PCT/JP2008/002745
§ 371 (c)(1),
(2), (4) Date: Jun. 25, 2010

(87) PCT Pub. No.: WO2009/081512
PCT Pub. Date: Jul. 2, 2009

(65) Prior Publication Data
US 2011/0086667 A1   Apr. 14, 2011

(30) Foreign Application Priority Data
Dec. 26, 2007 (JP) .................................. 2007-334161

(51) Int. Cl.
*H04M 1/00* (2006.01)
(52) U.S. Cl. ................ 455/575.7; 455/550.1; 455/552.1
(58) Field of Classification Search .............. 455/550.1, 455/552.1, 78, 575.1, 575.5, 575.7; 343/702, 343/724, 725, 853, 876, 893
See application file for complete search history.

(56) References Cited

U.S. PATENT DOCUMENTS
7,136,022 B2 * 11/2006 Sato et al. ..................... 343/702
7,519,174 B2    4/2009 Tanaka et al.
7,768,462 B2 *  8/2010 Zhang et al. .................. 343/702
(Continued)

FOREIGN PATENT DOCUMENTS
JP        2003168916 A      6/2003
(Continued)

OTHER PUBLICATIONS
ISA, International Search Report, mailed Nov. 25, 2008, PCT/JP2008/002745, 2 pages.

*Primary Examiner* — Sonny Trinh
(74) *Attorney, Agent, or Firm* — Seed IP Law Group PLLC

(57) ABSTRACT

A challenge to be met by the present invention is to provide a radio communication apparatus that enables prevention of a drop in antenna gain, which would otherwise arise when an apparatus main body is placed on a metal plate, such as a metallic desk, at low cost. A second antenna element (3) is placed at such a position where resonance arises at a frequency band of a first antenna element (2) and connected to a ground pattern of a circuit board (10) by way of an antenna grounding unit (8) connected exclusively to a radio system unit (7). Further, a reactance unit (82) of the antenna grounding unit (8) performs regulation such that the second antenna element (3) is electromagnetically coupled with the metal plate, to thus cause resonance at a predetermined frequency, when the apparatus main body is placed on the metal plate and that the resonance frequency becomes a frequency band of the first antenna element (2). When the apparatus main body is placed on the metal plate while a radio signal is being transmitted at the frequency band of the first antenna element (2), the second antenna element (3) can thereby be used as a passive element, so that occurrence of a drop in gain of the first antenna element (2) can be prevented.

7 Claims, 8 Drawing Sheets

U.S. PATENT DOCUMENTS

| | | | |
|---|---|---|---|
| 7,843,394 B2 * | 11/2010 | Egawa et al. | 343/702 |
| 7,852,272 B2 * | 12/2010 | Imano et al. | 343/702 |
| 7,940,222 B2 * | 5/2011 | Man et al. | 343/702 |
| 8,072,390 B2 * | 12/2011 | Breiter | 343/852 |
| 8,094,079 B2 * | 1/2012 | Schlub et al. | 343/702 |

FOREIGN PATENT DOCUMENTS

| | | |
|---|---|---|
| JP | 2004274445 A | 9/2004 |
| JP | 2005117099 A | 4/2005 |
| JP | 2005-344870 A | 12/2005 |
| WO | 2004042947 A1 | 5/2004 |

* cited by examiner (a)

(b)

(a)

(b)

RADIO COMMUNICATION APPARATUS

TECHNICAL FIELD

The present invention relates to a radio communication apparatus, such as a portable phone and a PHS (Personal Handy Phone System), and, more particularly, a radio communication apparatus that enables execution of an application, such as a Bluetooth application, a W-LAN (Wireless LAN) application, and a GPS (Global Positioning System) as well as performance of common communication operation of a call and an electronic mail.

BACKGROUND ART

A radio communication apparatus, such as a portable phone and a PHS, has recently become multifunctional so as to be able to execute; for instance, an application, such as a Bluetooth application, a W-LAN application, and a GPS application, in addition to being able to make a call or carry out E-mail communications. As a result of expansion of functionality, the radio communication apparatus is frequently equipped with an application antenna element as well as a communication antenna element. FIG. 11 is an oblique perspective view showing an external view of a radio communication apparatus having such two antenna elements. In the drawing, a communication antenna element 101 and an application antenna element 102 are arranged in an enclosure 100 while spaced apart from each other. The communication antenna element 101 is supplied with communication power, and the application antenna element 102 is supplied with application power.

In the meantime, as shown in FIG. 12, when the radio communication apparatus is placed on a metal plate 200, such as a metallic desk, an antenna gain of the radio communication apparatus drops. For this reason, an attempt is made to prevent deterioration of the antenna gain by providing the radio communication apparatus with a passive element 103. The passive element 103 is provided, as distinct from the application antenna element 102, only for enhancing an antenna gain.

An element effecting the same function as that of the passive element 103 shown in FIG. 12 is a "radiating element" described in connection with; for instance, Patent Document 1. The radiating element is connected to a ground face of a substrate provided in an apparatus main body in a thickness-wise direction of the apparatus main body (i.e., a substantially perpendicular direction achieved when the apparatus main body is placed on a desk, or the like). A high frequency current flows into a circuit board as described in connection with Patent Document 1. In a state where the communication terminal is placed on a metal plate, a high frequency current of opposite phase flows into the metal plate by a mirror image effect. For this reason, the high frequency current is canceled, whereupon radiation of the antenna is weakened, thereby deteriorating the antenna gain. However, a component perpendicular to the metal plate does not cancel each other, so that the radiating element symmetrically makes up a dipole antenna with respect to the metallic plate. Deterioration of an antenna gain is thereby prevented.
Patent Document 1: WO 2004-042947

DISCLOSURE OF THE INVENTION

Problem that the Invention is to Solve

As mentioned above, the passive element 103 is provided in the related art, to thus prevent deterioration of the antenna gain, which would otherwise be caused when the apparatus main body is placed on the metal plate 200. However, provision of a new passive element raises problems of a corresponding increase in cost and a corresponding increase in footprint.

The present invention has been conceived in view of the circumstance and aims at providing a radio communication apparatus that enables an improvement in antenna gain acquired when an apparatus main body is placed on a metal plate, such as a metallic desk, and that enables prevention of an increase in footprint.

Means for Solving the Problem

In order to accomplish the objective, a radio communication apparatus of the present invention for conducting a radio communication at a plurality of communication frequencies, comprising: a circuit board arranged in the radio communication apparatus; a first antenna element; a first feeding unit provided on the circuit board and connected to the first antenna element, and that feeds communication power to the first antenna element; a second antenna element that conducts a communication at a frequency different from that of the first antenna element; a second feeding unit provided on the circuit board and connected to the second antenna element, and that feeds communication power to the second antenna element; a radio system unit connected to the second feeding unit, and that conducts a communication; and an antenna grounding unit connected to the second feeding unit, and that connects the second antenna element to the circuit board through an element having predetermined impedance.

By the configuration, when the second antenna element conducts the communication effected by the radio system unit and when the radio communication apparatus is placed on a metal plate, the second antenna element can be used also as a passive element. A drop in gain of the first antenna element, which would otherwise arise when the apparatus main body is placed on the metal plate, can be thereby prevented. In particular, when the apparatus main body is placed on the metal plate, a value of an impedance element of the antenna grounding unit is regulated such that a resonance frequency of the second antenna element becomes the frequency band of the first antenna element. When the apparatus main body is placed on the metal plate, the second antenna element can be thereby used as a passive element of the first antenna element. A drop in gain of the first antenna element, which would otherwise arise when the apparatus main body is placed on the metal plate, can thereby be prevented.

Further, the second antenna element acts as both the antenna for the radio system unit and the passive element of the first antenna element and can operate independently. Therefore, when compared with a case where a dedicated passive element is provided, a cost increase can be minimized, and a footprint can be effectively utilized.

Moreover, in the configuration, the radio system unit has a band limiting unit that shuts off a first frequency used by the first antenna element for communication and that allows passage of a second frequency used by the second antenna element for communication.

By the configuration, the second antenna element is connected to the radio system unit by way of the second feeding unit without affecting the antenna grounding unit and can be used for a communication carried out by the radio system unit.

In the configuration, the antenna grounding unit has a band limiting unit that allows passage of a first frequency used by the first antenna element for communication and that shuts off a second frequency used by the second antenna element for communication.

By the configuration, the second antenna element is connected to the antenna grounding unit by way of the second feeding unit without affecting the radio system unit. When the apparatus main body is placed on the metal plate, the second antenna element can be used as a passive element of the first antenna element. A drop in gain of the first antenna element, which would otherwise arise when the apparatus main body is placed on the metal plate, can thereby be prevented.

In the configuration, the element having predetermined impedance is a reactance element.

By the configuration, it is possible to regulate a resonance frequency of the second antenna element so as to come to the frequency band of the first antenna element when the apparatus main body is placed on the metal plate.

Also, in the above configuration, the radio communication apparatus further comprises a display unit provided on one face of the circuit board, and wherein the second antenna element is provided on a face of the circuit board opposite to the display unit.

By the configuration, when the apparatus main body is placed on the metal plate, the second antenna element is placed on the face where the second antenna element overlaps the metal, and the second antenna element is electromagnetically coupled with the metal plate. The second antenna element can thus be used as a passive element of the first antenna element. A drop in gain of the first antenna element, which would otherwise arise when the apparatus main body is placed on the metal plate, can thereby be prevented.

Also in the configuration, the radio communication apparatus further comprises a display unit provided on one face of the circuit board, wherein the second antenna element is provided on the same face of the circuit board on which the display unit is provided.

By the configuration, when the apparatus main body is placed on the metal plate, the second antenna element is placed on the face where the second antenna element overlaps the metal, and the second antenna element is electromagnetically coupled with the metal plate. The second antenna element can thus be used as a passive element of the first antenna element. A drop in gain of the first antenna element, which would otherwise arise when the apparatus main body is placed on the metal plate, can thereby be prevented.

Also, in the configuration, the radio communication apparatus further comprises an input unit arranged on one face of the circuit board, wherein the second antenna element is provided on a face of the circuit board opposite to the input unit.

By the configuration, when the apparatus main body is placed on the metal plate, the second antenna element is placed on the face where the second antenna element overlaps the metal, and the second antenna element is electromagnetically coupled with the metal plate. The second antenna element can thus be used as a passive element of the first antenna element. A drop in gain of the first antenna element, which would otherwise arise when the apparatus main body is placed on the metal plate, can thereby be prevented.

Also, in the configuration, the radio communication apparatus further comprises an input unit provided on one face of the circuit board, wherein the second antenna element is provided on the same face of the circuit board on which the input unit is provided.

By the configuration, when the apparatus main body is placed on the metal plate, the second antenna element is placed on the face where the second antenna element overlaps the metal, and the second antenna element is electromagnetically coupled with the metal plate. The second antenna element can thus be used as a passive element of the first antenna element. A drop in gain of the first antenna element, which would otherwise arise when the apparatus main body is placed on the metal plate, can thereby be prevented.

Advantage of the Invention

According to the present invention, an existing application antenna is used also as a passive element, and it becomes possible to prevent occurrence of a drop in antenna gain, which would otherwise be caused when a apparatus main body is placed on a metal plate, such as a metallic desk, while minimizing an increase in cost and footprint.

DESCRIPTIONS OF THE REFERENCE NUMERALS AND SYMBOLS

1 RADIO COMMUNICATION APPARATUS
2 FIRST ANTENNA ELEMENT
3 SECOND ANTENNA ELEMENT
4, 5 FEEDING UNIT
6 CELLULAR RADIO UNIT
7 RADIO SYSTEM UNIT
8 ANTENNA GROUNDING UNIT

9 CONTROL UNIT
10 CIRCUIT BOARD
11 DISPLAY UNIT
12 INPUT UNIT
71 FIRST RADIO UNIT FOR APPLICATION
72 SECOND RADIO UNIT FOR APPLICATION
73, 74 MATCHING CIRCUIT
75 SWITCHING UNIT
76, 81 BAND LIMITING UNIT
82 REACTANCE UNIT

BEST MODE FOR IMPLEMENTING THE INVENTION

A preferred embodiment for implementing the present invention is hereunder described in detail by reference to the drawings.

Figure 1:
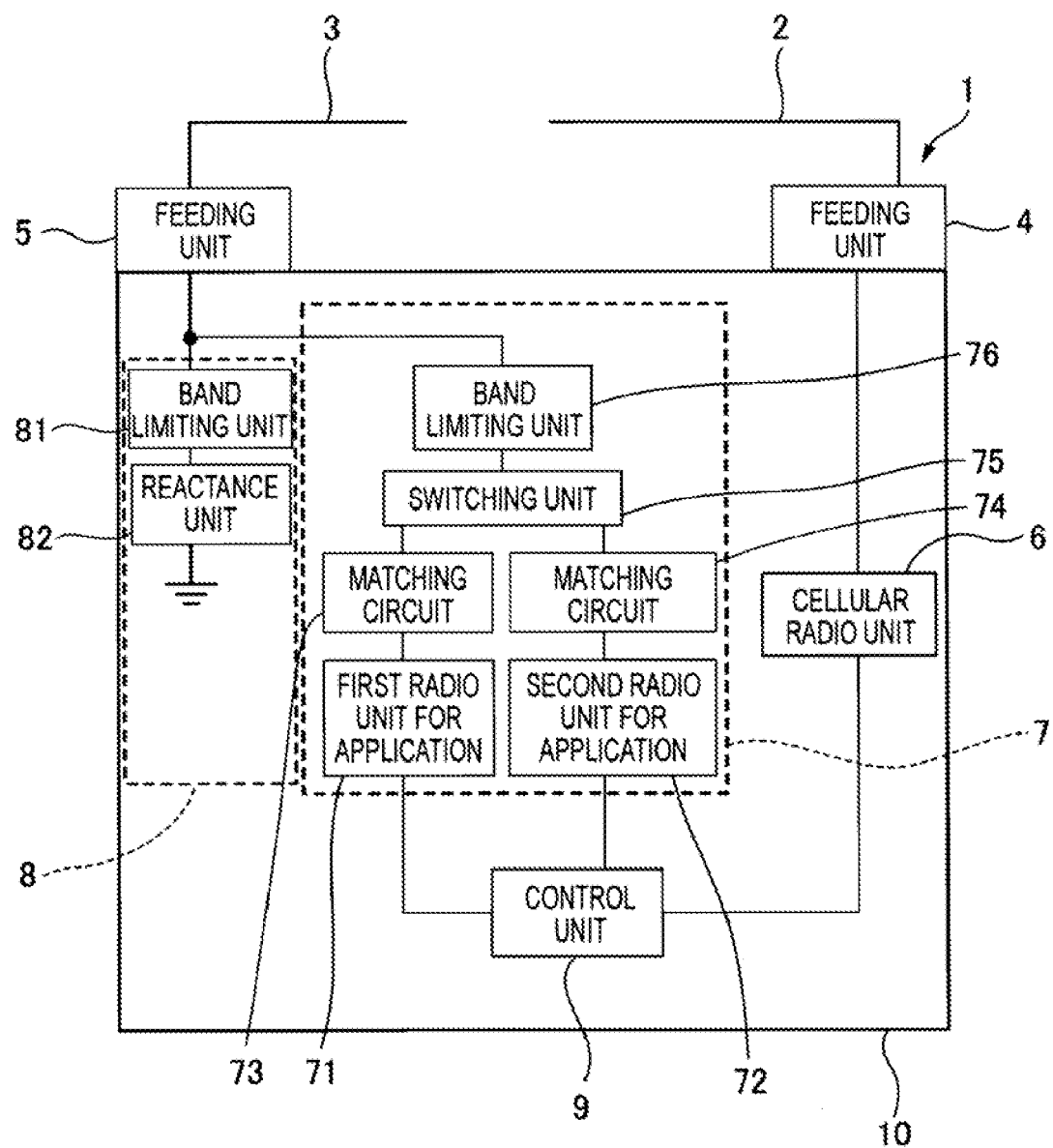
FIG. 1 It is a block diagram showing a general configuration of a radio communication apparatus of an embodiment of the present invention.

FIG. 1 is a block diagram showing a general configuration of a radio communication apparatus of an embodiment of the present invention. In the drawings, a radio communication apparatus 1 of the embodiment includes first and second antenna elements 2 and 3, feeding units 4 and 5, a cellular radio unit 6, a radio system unit 7, an antenna grounding unit 8, a control unit 9, and a circuit board 10.

The first antenna element 2 is used for transmission and receipt of a radio signal performed by the cellular radio unit 6. The second antenna element 3 is used for transmission and receipt of a radio signal performed by the radio system unit 7. The feeding unit 4 feeds communication power from the cellular radio unit 6 to the first antenna element 2. The feeding unit 5 feeds communication power from the radio system unit 7 to the second antenna element 3.

The cellular radio unit 6 is a radio unit that carries out communication, such as a call and a mail, and that transmits and receives a radio wave by way of the first antenna element 2. A frequency band used by the cellular radio unit 6 for communication is principally an 800 MHz band, a 1.7 GHz band, a 2 GHz band, or the like. In the present embodiment, the 800 MHz band is assumed to be taken as a frequency band used by the cellular radio unit 6 for communication, and the same band is also assumed to be likewise used for a resonance frequency of the first antenna element 2.

The radio system unit 7 has a first radio unit 71 for an application, second radio unit 72 for application, matching circuits 73 and 74, a switching unit 75, and a band limiting unit 76. The first radio unit 71 and the second radio unit 72 are radio units for application purposes, such as a Bluetooth application, a W-LAN application, and a GPS application. In the present embodiment, the first radio unit 71 is assumed to transmit and receive a Bluetooth radio signal whose communication frequency is at a 2.4 GHz band. The second radio unit 72 is assumed to transmit and receive a GPS radio signal whose communication frequency is at a 1.5 GHz band.

Figure 2:
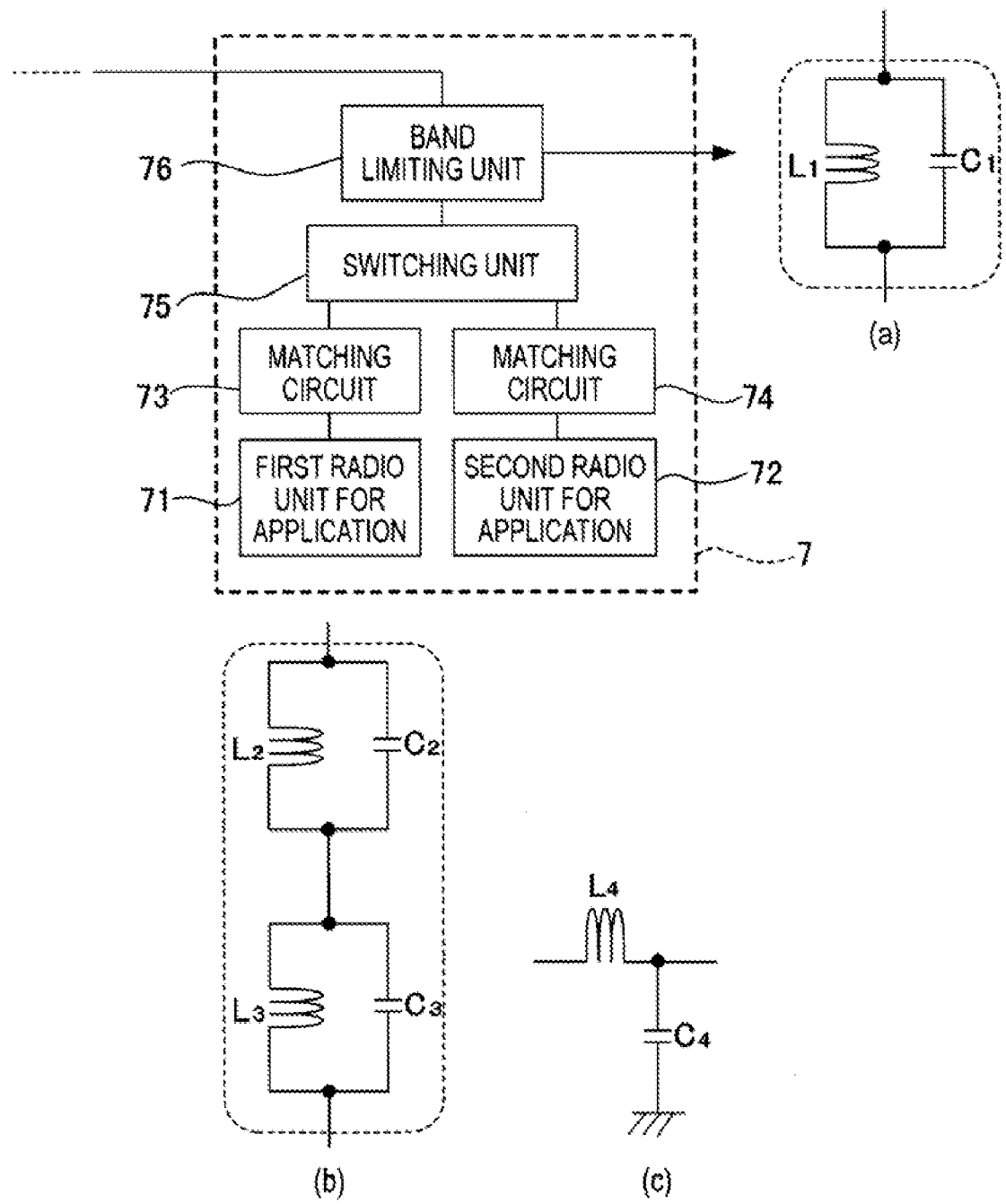
FIG. 2 It is a view showing a specific example configuration of a trap circuit of a radio system unit of the radio communication apparatus of the embodiment of the present invention.

The band limiting unit 76 is a filter that allows passage of only the radio signal of 2.4 GHz band used by the first radio unit 71 for communication and passage of only the radio signal of 1.5 GHz band used by the second radio unit 72 for communication. The band limiting unit 76 is composed specifically of a parallel-connected circuit made by parallel connection of an inductor $L_1$ and a capacitor $C_1$, as shown in; for instance, FIG. 2(a). The parallel-connected circuits are provided equal in number to the application radio units. In the present embodiment, as shown in FIG. 2(b), a circuit that allows passage of only a signal of 1.5 GHz band and that is made by parallel connection of an inductor $L_2$ and a capacitor $C_2$ and another circuit that allows passage of only a signal of 2.4 GHz band and that is made by parallel connection of an inductor $L_3$ and a capacitor $C_3$ are connected in series. Each of the parallel-connected circuits is configured so as to shut off a signal of 800 MHz band used by the cellular radio unit 6 and the first antenna element 2 for communication. The switching unit 75 switches between a connection of the first radio unit 71 with the second antenna element 3 and a connection of the second radio unit 72 with the second antenna element 3, in accordance with operation of the first radio unit 71 and operation of the second radio unit 72, as required. Specifically, the switching unit can be embodied by means of a switching module, such as an SPDT. The matching circuit 73 regulates the resonance frequency of the second antenna element so as to become a frequency used by the application 1 radio unit for communication. The matching circuit is made up of; for instance, an L-type circuit including an inductor $L_4$ and a capacitor $C_4$, as shown in; for instance, FIG. 2(c). In the second embodiment, the matching circuit 73 regulates the resonance frequency of the second antenna element 3 so as to come to a 2.4 GHz band. The matching circuit 74 is for regulating a resonance frequency of the second antenna element so as to become a frequency used by the second radio unit for communication. The matching circuit 74 has a configuration, such as that shown in FIG. 2(c), in the same manner as does the matching circuit 73. In the present embodiment, the matching circuit 74 is adjusted such that the resonance frequency of the second antenna element 3 comes to a 1.5 GHz band.

Turning back to FIG. 1, the antenna grounding unit 8 has a band limiting unit 81 and a reactance unit 82. The antenna grounding unit 8 connects the second antenna element 3 to a ground pattern of the circuit board 10. In the antenna grounding unit 8, the band limiting unit 81 allows passage of only a signal of a frequency band used by the first antenna element 2 for communication and shuts off a signal of a frequency band used by the second antenna element for communication. Consequently, the band limiting unit appears to be open for the radio system unit 7. The second antenna element 3 is connected to the ground pattern of the circuit board by means of only the frequency band of the first antenna element 2. In particular, the reactance unit 82 regulates a resonance frequency such that the resonance frequency of the second antenna element 3 achieved on the metal plate comes to the frequency band of the first antenna element 2.

Figure 3:
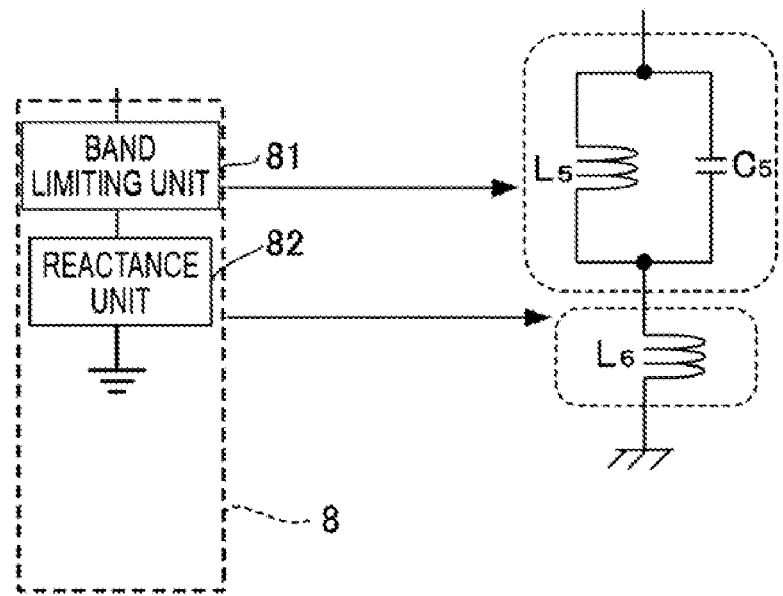
FIG. 3 It is a view showing a specific example configuration of a reactance unit of an antenna grounding unit of the radio communication apparatus of the embodiment of the present invention.

FIG. 3 is a view showing a specific example configuration of the antenna grounding unit 8. The antenna grounding unit has the band limiting unit 81 that allows passage of only a signal of 800 MHz band, which is a frequency band used by the first antenna element 2 for communication, and that is made by parallel connection of an inductor $L_5$ with a capacitor $C_5$ and the reactant unit 82 made up of an inductor $L_6$ for regulating a resonance frequency of the second antenna element 3 on the metal plate so as to become the frequency of the first antenna element 2. In FIG. 3, the reactance unit 82 includes an inductor but may also be built from a capacitor and a register.

As mentioned above, the antenna grounding unit 8 performs regulation in such a way that the resonance frequency of the second antenna element 3 achieved when the apparatus main body is placed on the metal plate becomes the frequency band of the first antenna element 2. Thus, in a case where the apparatus main body is placed on the metal plate while transmitting a radio signal from the first antenna element 2, the second antenna element 3 acts as a passive element of the first antenna element 2, thereby preventing a drop in gain of the first antenna element 2 acquired on the metal plate.

The control unit 9 includes an unillustrated microcomputer, a program for controlling the microcomputer, and work memory used during operation of the microcomputer; and controls respective portions of the apparatus main body. The control unit 9 lets the cellular radio unit 6 operate when performing cellular radio communication. When performing Bluetooth communication, the control unit lets the first radio unit 71 operate. When performing GPS communication, the control unit lets the second radio unit 72 operate.

Operation of the radio communication apparatus 1 of the embodiment is now described. When performing radio communication by means of the cellular radio unit 6, the control unit 9 lets the cellular radio unit 6 operate. Further, the second antenna element 3 is connected to the ground pattern of the circuit board 10 by means of the antenna grounding unit 8. When the radio communication apparatus 1 is placed on the metal plate, the second antenna element 3 is electromagnetically coupled with the metal plate, thereby causing resonance at a predetermined frequency. Moreover, the reactance unit 82 of the antenna grounding unit 8 makes it possible to perform regulation such that the resonance frequency of the second antenna element 3 achieved when the apparatus main body is placed on the metal plate becomes a frequency used by the first antenna element. As a result, the second antenna element 3 operates as a passive element of the first antenna element 2, so that a drop in gain of the first antenna element 2 acquired on the metal plate is prevented.

In the meantime, when the first radio unit 71 performs radio communication, the control unit 9 lets the first radio unit 71 operate. As a result of activation of the first radio unit 71, communication power from the first radio unit 71 is supplied to the second antenna element 3 by way of the matching circuit 73, the switching unit 75, the band limiting unit 76, and the feeding unit 5. A Bluetooth radio signal whose communication frequency is 2.4 GHz band is thereby transmitted from the second antenna element 3. The frequency band of 2.4 GHz band employed by the first radio unit 71 at this time is blocked by the band limiting unit 81, so that the radio signal does not flow into the antenna grounding unit 8. The radio signal passed through the band limiting unit 76 is input intact into the second antenna element 3 by way of the feeding unit 5.

When the second radio unit 72 carries out radio communication, the control unit 9 lets the second radio unit 72 operate. As a result of activation of the second radio unit 72, the communication power from the second radio unit 72 is supplied to the second antenna element 3 respectively by way of the matching circuit 75, the switching unit 74, the band limiting unit 76, and the feeding unit 5. A radio signal of GPS frequency band whose communication frequency is at a 1.5 GHz band is transmitted from the second antenna element 3. The frequency band of 1.5 GHz employed by the second radio unit 72 at this time is blocked by the band limiting unit 81, so that the radio signal does not flow into the antenna grounding unit 8. The radio signal passed through the band limiting unit 76 is input intact into the second antenna element 3 by way of the feeding unit 5.

As mentioned above, in the radio communication apparatus 1 of the present embodiment, the second antenna element 3 is connected to the ground pattern of the circuit board by way of the antenna grounding unit 8. When the radio communication apparatus 1 is placed on the metal plate, the second antenna element 3 is electromagnetically coupled with the metal plate, thereby causing resonance at a predetermined frequency. Moreover, the reactance unit 82 of the antenna grounding unit 8 performs regulation such that the resonance frequency of the second antenna element 3 achieved when the apparatus main body is placed on the metal plate becomes a frequency band of the first antenna element 2. As a result, the second antenna element 3 can be used as a passive element in a case where the apparatus main body is placed on the metal plate while transmitting a radio signal of 800 MHz band that is a frequency band of the first antenna element 2, so that a drop in gain of the first antenna element 2 can be prevented.

Concurrently, the second antenna element 3 can operate as an antenna for the radio system unit 7, to thus enable GPS and Bluetooth communication. Further, the second antenna element can also double as a passive element of the first antenna element 2. As a result, when compared with a case where a dedicated passive element is provided, a cost increase can be minimized, and a footprint can be reduced.

Figure 4:
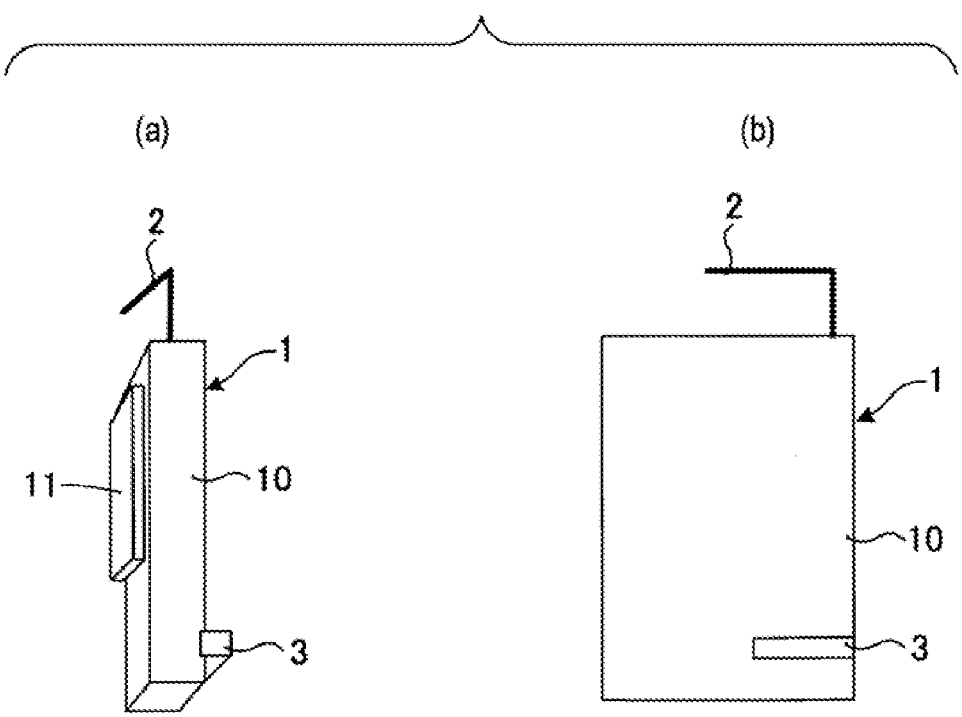
FIG. 4 It is a view showing another example layout of a second antenna element of the radio communication apparatus of the embodiment of the present invention.
Figure 5:
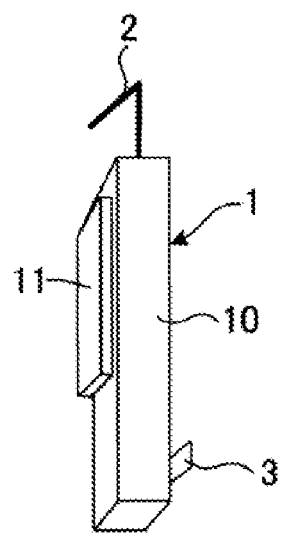
FIG. 5 It is a view showing another example layout of the second antenna element of the radio communication apparatus of the embodiment of the present invention.
Figure 5:
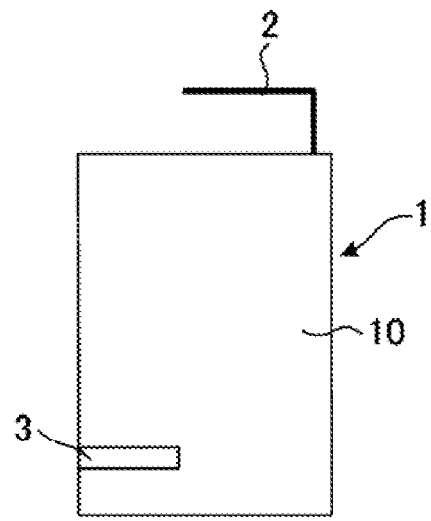
Figure 6:
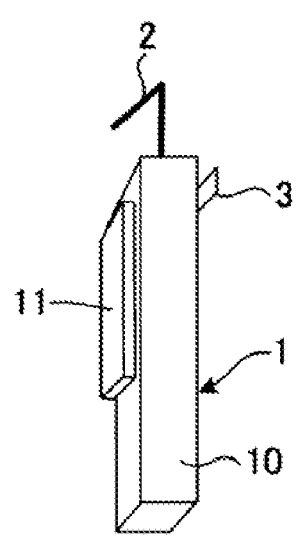
FIG. 6 It is a view showing another example layout of the second antenna element of the radio communication apparatus of the embodiment of the present invention.
Figure 6:
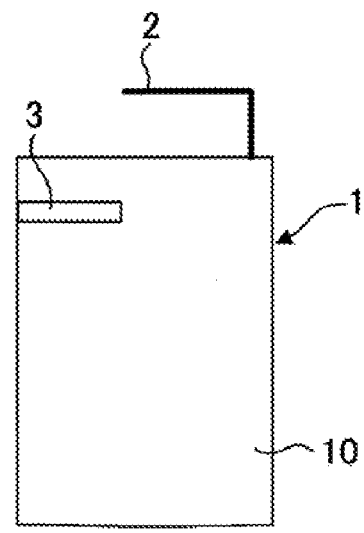
Figure 7:
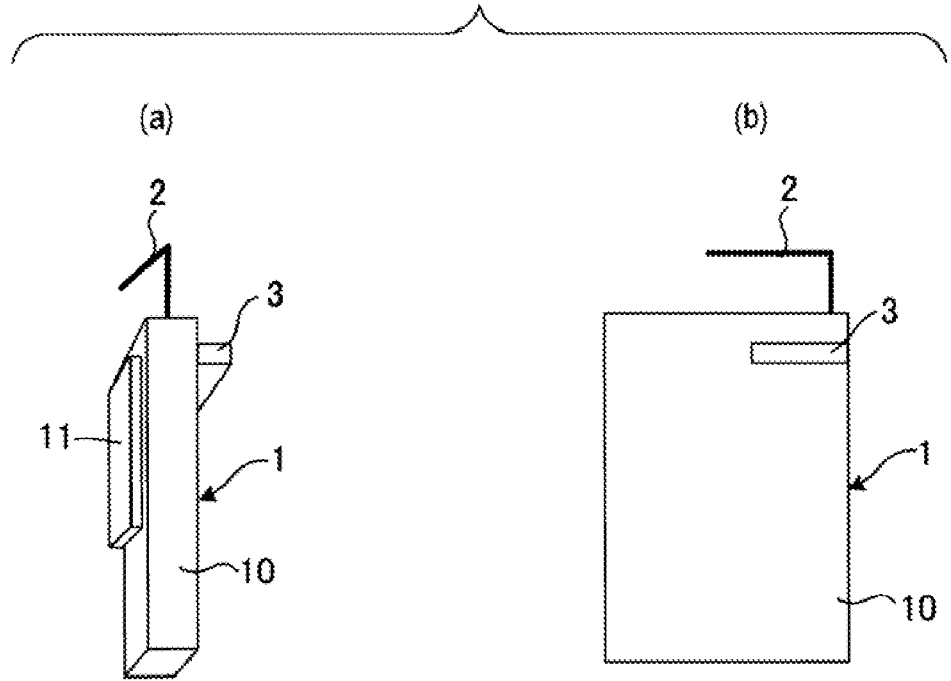
FIG. 7 It is a view showing another example layout of the second antenna element of the radio communication apparatus of the embodiment of the present invention.
Figure 8:
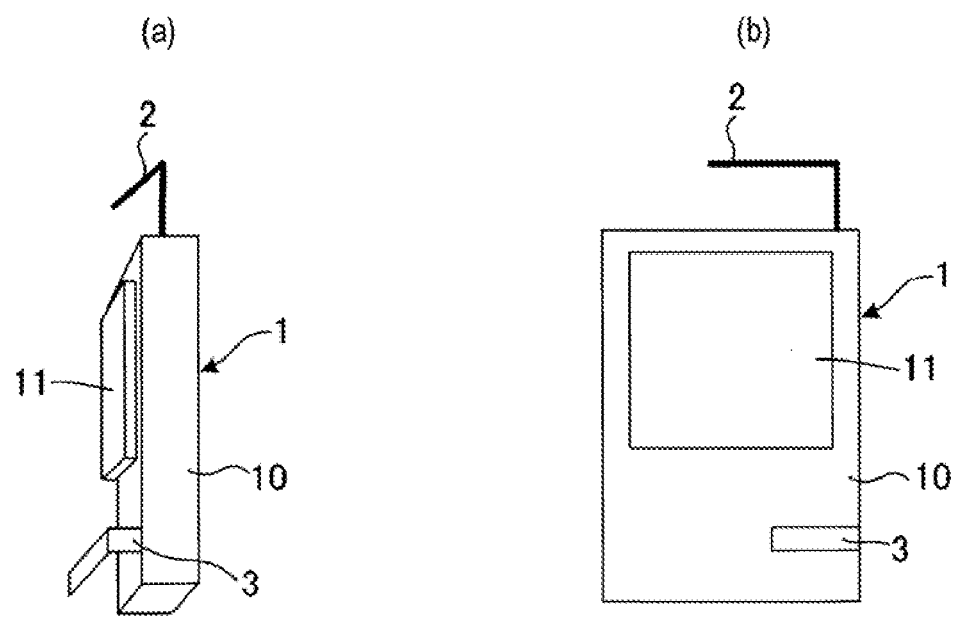
FIG. 8 It is a view showing another example layout of the second antenna element of the radio communication apparatus of the embodiment of the present invention.
Figure 9:
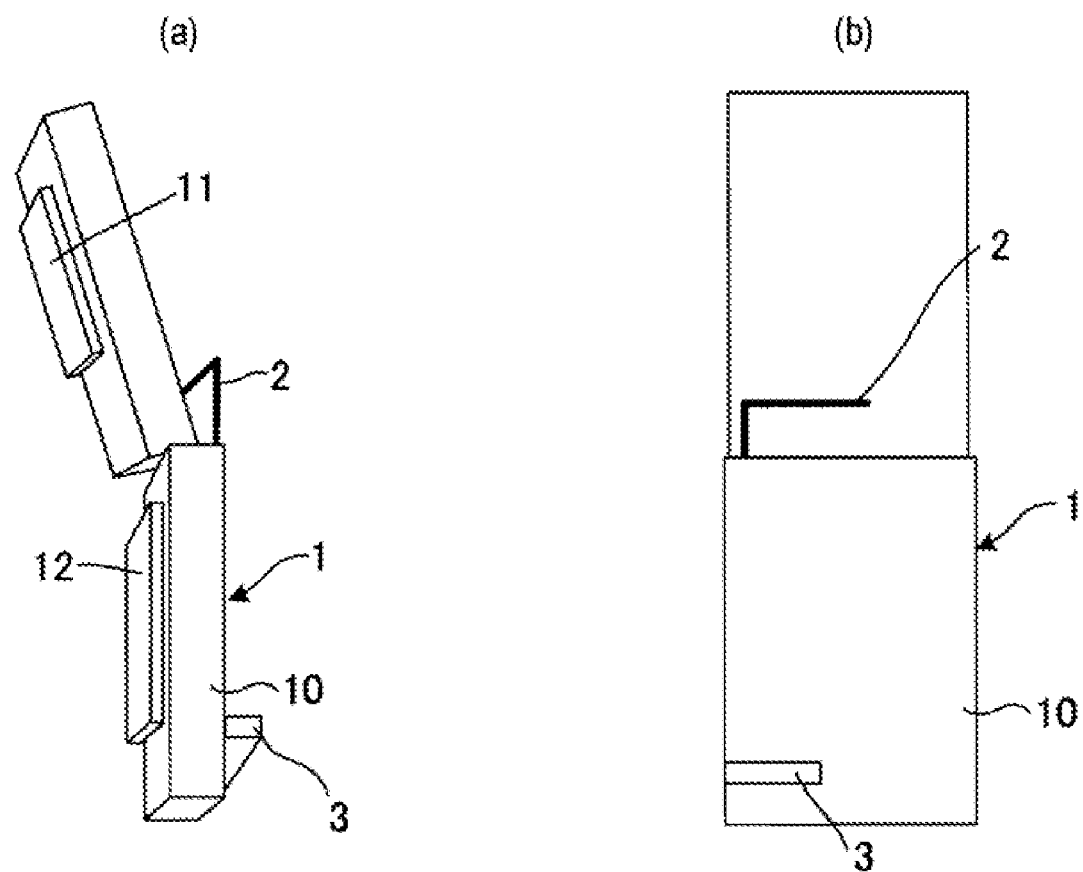
FIG. 9 It is a view showing another example layout of the second antenna element of the radio communication apparatus of the embodiment of the present invention.
Figure 10:
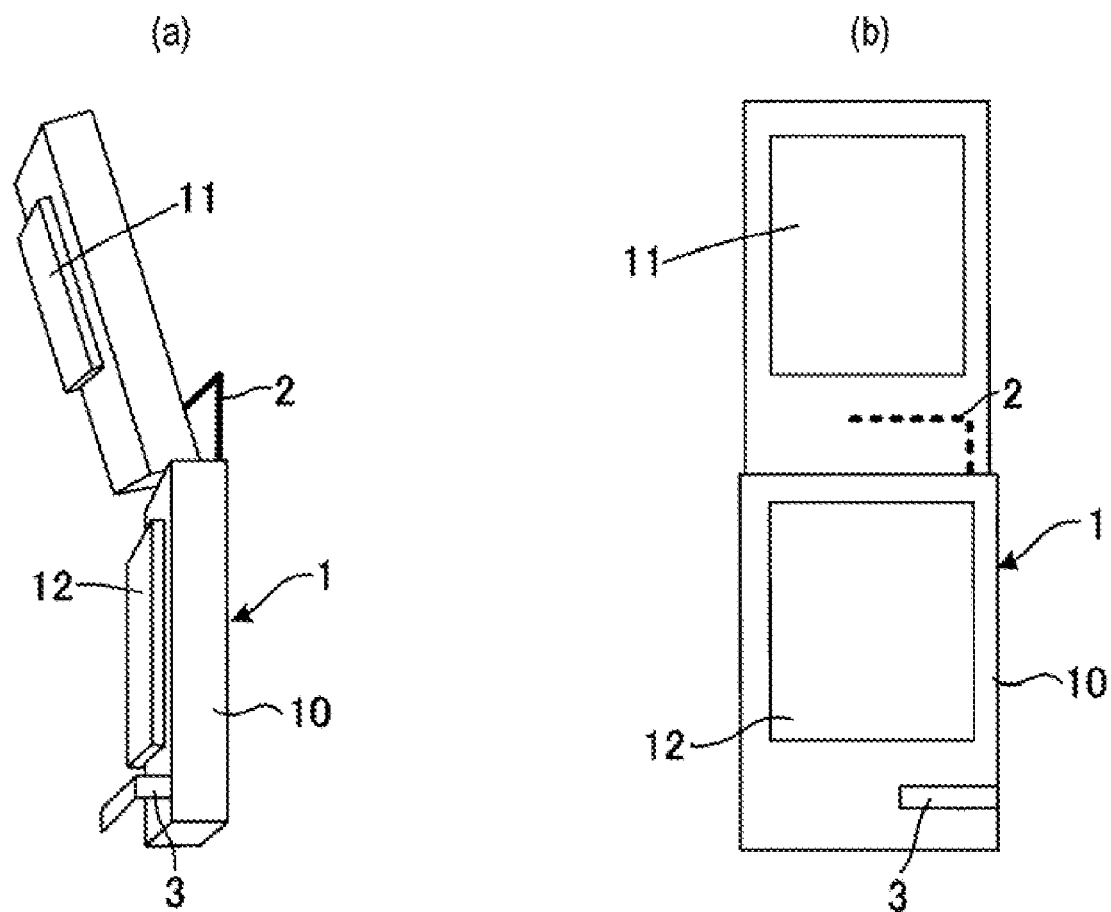
FIG. 10 It is a view showing another example layout of the second antenna element of the radio communication apparatus of the embodiment of the present invention.
Figure 11:
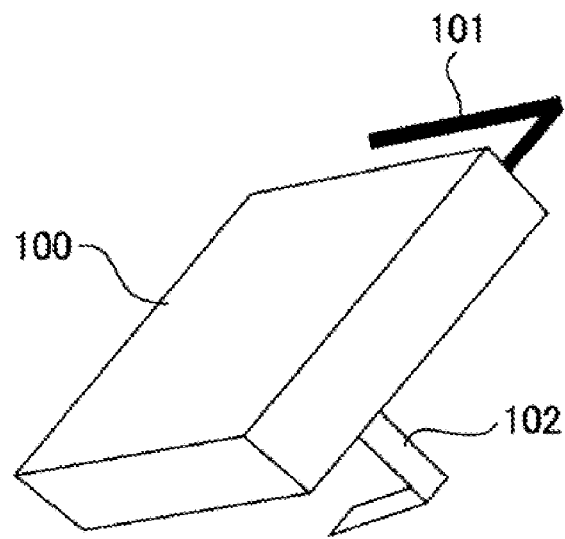
FIG. 11 It is an oblique perspective view showing an appearance of a related-art radio communication apparatus having two antenna elements.
Figure 12:
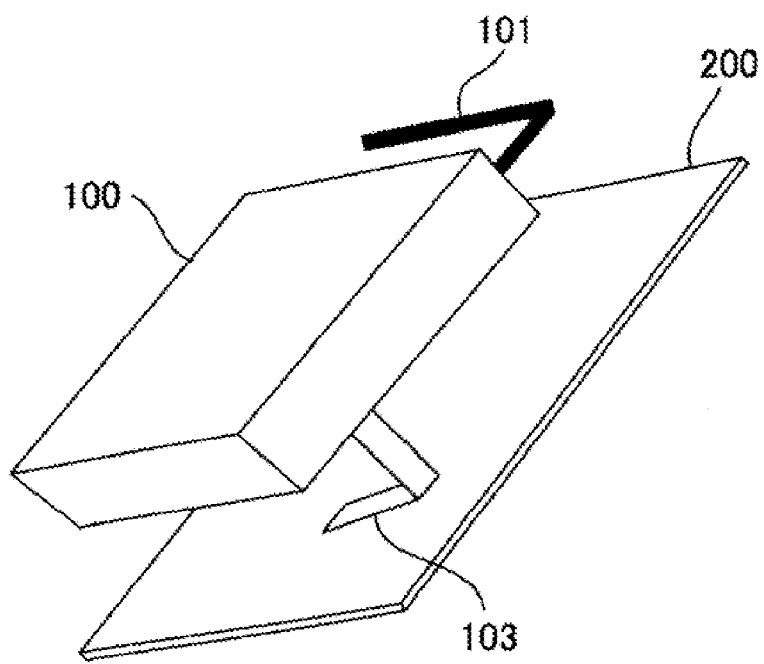
FIG. 12 It is an oblique perspective view showing an appearance of a related-art radio communication apparatus having a passive element and a metal plate.

In the embodiment, the second antenna element 3 is arranged at a position where the second antenna element is electromagnetically coupled with the metal plate when the radio communication apparatus 1 is placed on the metal plate. However, there is no necessity for limiting the position of the second antenna element 3. The second antenna element 3 can be arranged at any location, so long as the reactance unit 82 of the antenna grounding unit 8 is regulated such that the resonance frequency of the apparatus main body acquired on the metal plate comes to the frequency band of the first antenna element 2. Moreover, mentions have been made of the radio communication apparatus 1 of a straight shape in the embodiment; however, the radio communication apparatus is not limited to the straight shape. As shown in FIGS. 9 and 10, the radio communication apparatus can be embodied without involvement of a structural limitation, like a radio communication apparatus of a foldable shape and a radio communication apparatus of a slidable shape. FIGS. 4 through 10 show example layouts of the second antenna element 3. Through the respective drawings, symbol (a) designates oblique perspective views. FIGS. 8(*b*) and 10(*b*) are front views, and FIGS. 4(*b*), 5(*b*), 6(*b*), 7(*b*), and 9(*b*) are rear views. FIG. 4 shows an example in which the second antenna element 3 is provided on a face of the apparatus main body opposite to a display unit for displaying an operation screen, or the like, and at a right-side point in an area opposite, in a longitudinal direction, to an area where the first antenna element 2 is placed. FIG. 5 shows an example in which the second antenna element 3 is provided on a face of the apparatus main body opposite to a display unit for displaying an operation screen, or the like, and at a left-side point in an area opposite, in a longitudinal direction, to an area where the first antenna element 2 is placed. FIG. 6 shows an example in which the second antenna element 3 is provided on the apparatus main body and at a point opposite to a location of the first antenna element 2 in a lateral direction, as in the case with the present embodiment. FIG. 7 shows an example in which the second antenna element 3 is provided at a point immediately below a location of the first antenna element 2 on the apparatus main body. FIG. 8 shows an example in which the second antenna element 3 is provided on a same face of the apparatus main body where there is provided the display unit for displaying an operation screen, or the like, and at a right-side point in an area opposite, in a longitudinal direction, to an area where the first antenna element 2 is placed. FIG. 9 shows an example in which the second antenna element 3 is provided on a face of the apparatus main body opposite to an input unit for enabling entry of a text, a number, and the like, and at a right-side point in an area opposite, in a longitudinal direction, to an area where the first antenna element 2 is placed. FIG. 10 shows an example in which the second antenna element 3 is provided on the same face of the apparatus main body where there is provided an input unit for enabling entry of a text, a number, and the like, and at a right-side point in an area opposite, in a longitudinal direction, to an area where the first antenna element 2 is placed.

In the embodiment, the cellular radio unit 6 is a radio unit that carries out a communication at the 800 MHz band. Accordingly, the resonance frequency of the first antenna element 2 is also at the 800 MHz band. However, the frequency band is not limited to the 800 MHz band, and the present invention is also based on the assumption that the cellular radio unit 6 will carry out communications at a plurality of frequencies and that the first antenna element 2 is also assigned a plurality of resonance frequencies accordingly.

The present invention has been described in detail and by reference to the specific embodiments. However, it is also manifest to those skilled in the art that the present invention be susceptible to various alterations and modifications without departing from the spirit and scope of the invention.

The present patent application is based on Japanese Patent Application (JP-A-2007-334161) filed on Dec. 26, 2007 in Japan, the entire subject matter of which is incorporated herein by reference.

Industrial Applicability

The present invention yields an advantage of the ability to prevent a drop in antenna gain, which would otherwise arise when a apparatus main body is placed on a metal plate, such as a metallic desk, at low cost and also to effectively utilize a footprint, and can be applied to a radio communication apparatus, such as a portable phone and a PHS.

The invention claimed is:

1. A radio communication apparatus for conducting a radio communication at a plurality of communication frequencies, comprising:
   a circuit board arranged in the radio communication apparatus;
   a first antenna element that conducts a communication at a first frequency band;
   a first feeding unit provided on the circuit board and connected to the first antenna element, and that feeds communication power to the first antenna element;
   a first radio unit connected to the first feeding unit, and that conducts a communication:
   a second antenna element that conducts a communication at a second frequency band different from that of the first antenna element;
   a second feeding unit provided on the circuit board and connected to the second antenna element, and that feeds communication power to the second antenna element;
   a second radio unit connected to the second feeding unit, and that conducts a communication; and
   an antenna grounding unit connected to the second feeding unit, and that connects the second antenna element to the circuit board through an element having predetermined impedance,
   wherein the second radio unit has a band limiting unit that shuts off the first frequency band and that allows passage of the second frequency band;
   wherein the antenna grounding unit has a band limiting unit that allows passage of the first frequency band and that shuts off the second frequency band; and
   wherein the antenna grounding unit regulates a resonance frequency of the second antenna element on a metal plate to the first frequency band.

2. The radio communication apparatus according to claim 1, wherein when the first radio unit and the second radio unit are in operation, the second antenna element conducts the communication at the second frequency band and acts as a passive element of the first antenna element.

3. The radio communication apparatus according to claim 1, wherein the element having predetermined impedance is a reactance element.

4. The radio communication apparatus according to claim 1, further comprising:
   a display unit provided on one face of the circuit board,
   wherein the second antenna element is provided on a face of the circuit board opposite to the display unit.

5. The radio communication apparatus according to claim 1, further comprising:
   a display unit provided on one face of the circuit board,
   wherein the second antenna element is provided on the same face of the circuit board on which the display unit is provided.

6. The radio communication apparatus according to claim 1, further comprising:
   an input unit arranged on one face of the circuit board,
   wherein the second antenna element is provided on a face of the circuit board opposite to the input unit.

7. The radio communication apparatus according to claim 1, further comprising:
   an input unit provided on one face of the circuit board,
   wherein the second antenna element is provided on the same face of the circuit board on which the input unit is provided.

* * * * *